US012343872B2

(12) United States Patent
Nishi et al.

(10) Patent No.: US 12,343,872 B2
(45) Date of Patent: Jul. 1, 2025

(54) COMPUTER, METHOD FOR CONTROLLING ROBOT, AND COMPUTER SYSTEM

(71) Applicant: Hitachi, Ltd., Tokyo (JP)

(72) Inventors: Kaichiro Nishi, Tokyo (JP); Nobuaki Nakasu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 258 days.

(21) Appl. No.: 17/957,567

(22) Filed: Sep. 30, 2022

(65) Prior Publication Data

US 2023/0113622 A1 Apr. 13, 2023

(30) Foreign Application Priority Data

Oct. 7, 2021 (JP) .................................. 2021-165454

(51) Int. Cl.
 *B25J 9/16* (2006.01)

(52) U.S. Cl.
 CPC ............ *B25J 9/1612* (2013.01); *B25J 9/163* (2013.01); *B25J 9/1664* (2013.01)

(58) Field of Classification Search
 CPC ........ B25J 9/1612; B25J 9/163; B25J 9/1664; B25J 9/1674
 See application file for complete search history.

(56) References Cited

U.S. PATENT DOCUMENTS

| 10,132,613 | B2* | 11/2018 | Yoshikawa | .............. | G01S 17/89 |
| 2014/0074291 | A1* | 3/2014 | Emoto | ................... | B25J 9/1697 |
| | | | | | 700/258 |
| 2015/0094855 | A1* | 4/2015 | Chemouny | .......... | G05B 19/423 |
| | | | | | 901/3 |
| 2018/0361576 | A1* | 12/2018 | Sakai | ..................... | B25J 9/1694 |
| 2019/0022861 | A1* | 1/2019 | Namie | ................... | B25J 9/1664 |

(Continued)

FOREIGN PATENT DOCUMENTS

| CN | 107214702 A | * | 9/2017 | ............ | B25J 9/1664 |
| CN | 109605385 A | * | 4/2019 | ............ | B25J 11/009 |

(Continued)

OTHER PUBLICATIONS

JP-2008065860-A translation (Year: 2008).*

(Continued)

*Primary Examiner* — Kyle T Johnson
(74) *Attorney, Agent, or Firm* — Crowell & Moring LLP

(57) ABSTRACT

A robot that performs work including gripping an object and moving the object is controlled with high accuracy. A computer for controlling the robot that performs the work including gripping the object and moving the object stores trajectory information, acquires operating state information including a value indicating an operating state of the robot during the work and work state information including a value for grasping a state of the object gripped by the robot, generates estimated work state information including a value for grasping a future state of the object gripped by the robot based on the trajectory information, the operating state information, and the work state information, and generates control information for controlling the robot based on the trajectory information, the operating state information, the work state information, and the estimated work state information.

12 Claims, 12 Drawing Sheets

(56) References Cited

U.S. PATENT DOCUMENTS

| | | | |
|---|---|---|---|
| 2022/0168899 A1* | 6/2022 | Boroushaki | G05B 19/4155 |
| 2022/0203547 A1* | 6/2022 | Majumdar | G06T 7/73 |
| 2022/0305651 A1* | 9/2022 | Toshimitsu | B25J 9/1615 |
| 2023/0113622 A1* | 4/2023 | Nishi | B25J 9/1674 |
| | | | 700/245 |
| 2023/0339111 A1* | 10/2023 | Hamaya | B25J 9/1664 |
| 2024/0308082 A1* | 9/2024 | Konar | B25J 9/1664 |

FOREIGN PATENT DOCUMENTS

| | | | | | |
|---|---|---|---|---|---|
| CN | 111360780 | A | * | 7/2020 | |
| JP | 2008065860 | A | * | 3/2008 | |
| JP | 2008279549 | A | * | 11/2008 | B25J 9/1687 |
| JP | 2019-942 | A | | 1/2019 | |
| JP | 2021-84159 | A | | 6/2021 | |
| JP | 2023058949 | A | * | 4/2023 | |
| JP | 2024072129 | A | * | 5/2024 | |

OTHER PUBLICATIONS

JP-2023058949-A translation (Year: 2023).*
JP-2024072129-A translation (Year: 2024).*
JP-2008279549-A translation (Year: 2008).*
CN-111360780-A translation (Year: 2020).*
CN-109605385-A translation (Year: 2019).*
CN-107214702-A (Year: 2017).*
Automated_tracking_and_grasping_of_a_moving_object_with_a_robotic_hand-eye_system (Year: 1993).*
Trajectory_filtering_and_predictions_for_automated_tracking (Year: 1992).*

* cited by examiner

FIG. 2

| ID | CLASSIFICATION | ITEM | CONTENT |
|---|---|---|---|
| 0 | Robot | Robot NAME | RoboA |
| 1 | Link0 | SHAPE FILE | Base.stl |
| 2 | Link1 | SHAPE FILE | Link1.stl |
| 3 | Link2 | SHAPE FILE | Link2.stl |
| ⋮ | ⋮ | ⋮ | ⋮ |
| 10 | Joint0 | PARENT LINK | Link0 |
| | | CHILD LINK | Link1 |
| | | JOINT TYPE | Revolute |
| | | JOINT ANGLE LOWER LIMIT | -180 |
| | | JOINT ANGLE UPPER LIMIT | +180 |
| | | JOINT VELOCITY UPPER LIMIT | 4.0 |
| 10 | Joint0 | PARENT LINK | Link0 |
| | | CHILD LINK | Link1 |
| | | JOINT TYPE | Revolute |
| | | JOINT ANGLE LOWER LIMIT | -180 |
| | | JOINT ANGLE UPPER LIMIT | +180 |
| | | JOINT VELOCITY UPPER LIMIT | 4.0 |
| ⋮ | ⋮ | ⋮ | ⋮ |

FIG. 3

| ID | EQUIPMENT NAME | ATTACHMENT TARGET | RELATIVE POSITION | RELATIVE POSTURE |
|---|---|---|---|---|
| 0 | ASSEMBLY CELL A | Root | (0,0,0) | (0,0,0) |
| 1 | RoboA | ASSEMBLY CELL A | (100,100,0) | (0,90,0) |
| 2 | RoboAのJoint6 | FORCE SENSOR | (0,0,10) | (0,180,0) |
| 3 | RoboAのJoint6 | ACCELERATION SENSOR | (0,0,20) | (0,180,0) |
| ⋮ | ⋮ | ⋮ | ⋮ | ⋮ |

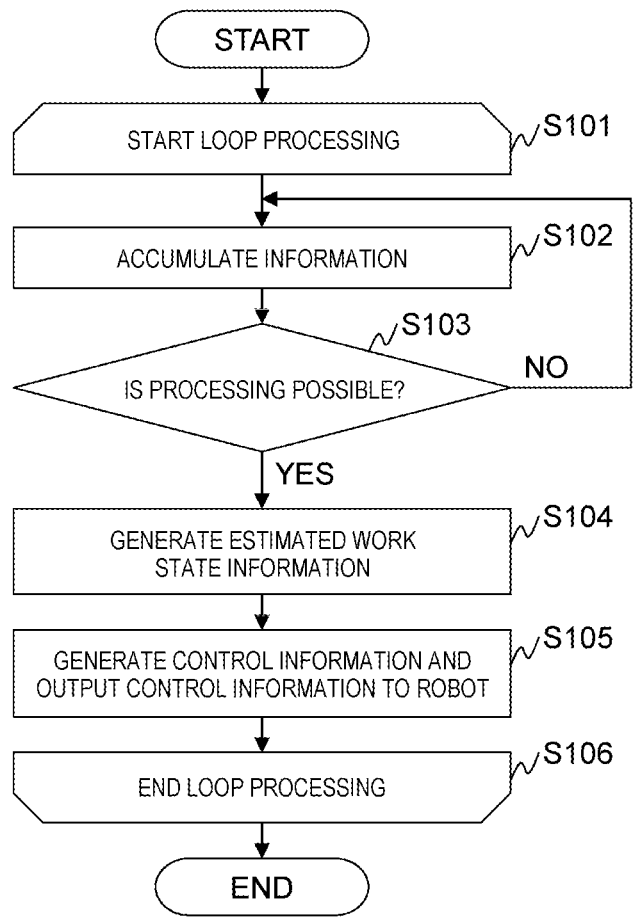

FIG. 6B

| Time Step | Fx | ... | Fz | Tx | ... | Tz | Ax | ... | Az | Vx | ... | Vz |
|---|---|---|---|---|---|---|---|---|---|---|---|---|
| 1 | 0.0 | ... | 2.0 | 0.0 | ... | 0.0 | 0.4 | ... | 0.0 | 1.0 | ... | 0.0 |
| 2 | 0.0 | ... | 2.0 | 0.0 | ... | 0.1 | 0.5 | ... | 0.1 | 1.1 | ... | 0.1 |
| 3 | 0.1 | ... | 2.0 | 1.1 | ... | 0.5 | 0.4 | ... | 0.0 | 1.2 | ... | 0.0 |
| 4 | 0.0 | ... | 2.1 | 1.0 | ... | 0.0 | 0.3 | ... | 0.0 | 1.3 | ... | 0.0 |
| 5 | 0.0 | ... | 2.0 | 1.2 | ... | 0.0 | 0.3 | ... | 0.1 | 1.2 | ... | 0.1 |

FIG. 10

| ID (1001) | PARTIAL PATH ID (1002) | COORDINATE AXIS (1003) | FREQUENCY (1004) | | | | | | |
|---|---|---|---|---|---|---|---|---|---|
| | | | 1 | 2 | 3 | 4 | 5 | ... | N |
| 1 | A-H | X | 0.01 | 0.42 | 0.01 | 0.01 | 0.53 | ... | 0.01 |
| 2 | A-C | X | 0.01 | 0.41 | 0.01 | 0.01 | 0.01 | ... | 0.01 |
| 2 | C-H | X | 0.01 | 0.01 | 0.01 | 0.01 | 0.51 | ... | 0.01 |
| ... | ... | ... | ... | ... | ... | ... | ... | ... | ... |
| K | C-H | Z | 0.01 | 0.01 | 0.01 | 0.01 | 0.01 | ... | 0.01 |

1000

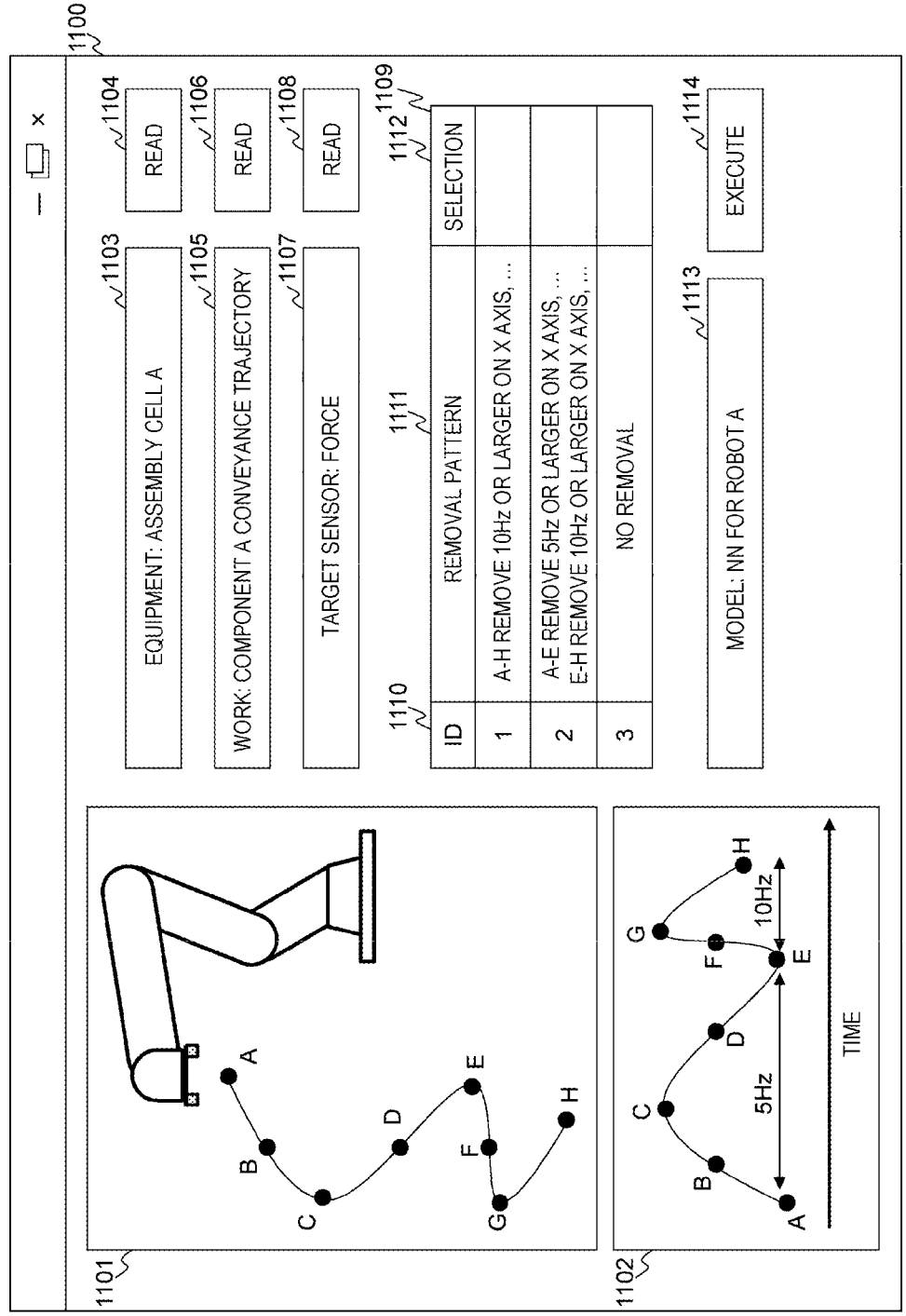

| Step | Force X | Force Y | Force Z |
|---|---|---|---|
| 1 | 0.01 | 0.01 | 20.01 |
| 2 | 0.13 | 0.21 | 20.10 |
| 3 | 1.21 | 0.31 | 20.22 |
| 4 | 0.29 | -2.19 | 48.89 |
| 5 | 0.42 | 0.11 | 19.99 |

BEFORE NOISE REMOVAL

| Step | Force X | Force Y | Force Z |
|---|---|---|---|
| 1 | 0.00 | 0.01 | 20.00 |
| 2 | 0.11 | 0.21 | 20.09 |
| 3 | 0.20 | 0.30 | 20.15 |
| 4 | 0.30 | 0.21 | 20.78 |
| 5 | 0.41 | 0.09 | 20.01 |

AFTER NOISE REMOVAL

COMPUTER, METHOD FOR CONTROLLING ROBOT, AND COMPUTER SYSTEM

CLAIM OF PRIORITY

The present application claims priority from Japanese patent application JP 2021-165454 filed on Oct. 7, 2021, the content of which is hereby incorporated by reference into this application.

BACKGROUND OF THE INVENTION

1. Field of the Invention

The present invention relates to control of a robot that performs work including gripping an object and moving the object.

2. Description of the Related Art

A technique disclosed in JP-A-2021-84159 (Patent Literature 1) is known as a technique of controlling a robot that performs work including gripping an object and moving the object. Patent Literature 1 discloses a control device "including a state information generation unit that generates and updates state information on a robot and a gripped object, and a control information generation unit that generates control information for controlling the robot based on a base trajectory generated in advance and the state information, the base trajectory being capable of causing the robot to move the gripped object from a start point to an end point".

Control is performed based on a current state according to the technique disclosed in Patent Literature 1. It can be expected that robot control will be performed with higher accuracy by taking a future state into consideration. An object of the invention is to implement a system and a method capable of controlling a robot with higher accuracy.

SUMMARY OF THE INVENTION

A representative example of the invention disclosed in the present application is as follows. That is, there is provided a computer for controlling a robot that performs work including gripping an object and moving the object. The computer includes: an arithmetic device; a storage device connected to the arithmetic device; and an interface connected to the arithmetic device. The storage device stores trajectory information on a trajectory of the robot when the object is gripped and moved during the work of the robot. The arithmetic device is configured to acquire operating state information including a value indicating an operating state of the robot during the work and work state information including a value for grasping a state of the object gripped by the robot, generate estimated work state information including a value for grasping a future state of the object gripped by the robot based on the trajectory information, the operating state information, and the work state information, and generate control information for controlling the robot based on the trajectory information, the operating state information, the work state information, and the estimated work state information.

According to the invention, the robot can be controlled with high accuracy. Problems, configurations, and effects other than those described above will be apparent from the following description of embodiments.

BRIEF DESCRIPTION OF THE DRAWINGS

FIG. 2 is a diagram showing an example of a data structure of robot configuration information according to the first embodiment.

FIG. 3 is a diagram showing an example of a data structure of equipment configuration information according to the first embodiment.

FIG. 5 is a flowchart showing an example of processing executed by a computer according to the first embodiment.

FIG. 6A is a diagram showing an example of operating state information and work state information stored in work history information according to the first embodiment.

FIG. 6B is a diagram showing an example of the operating state information and the work state information stored in the work history information according to the first embodiment.

FIG. 10 is a diagram showing an example of a data structure of noise analysis information generated by the computer according to the second embodiment.

FIG. 11A is a diagram showing an example of a screen displayed by the computer according to the second embodiment.

DESCRIPTION OF THE PREFERRED EMBODIMENTS

Figure 1:
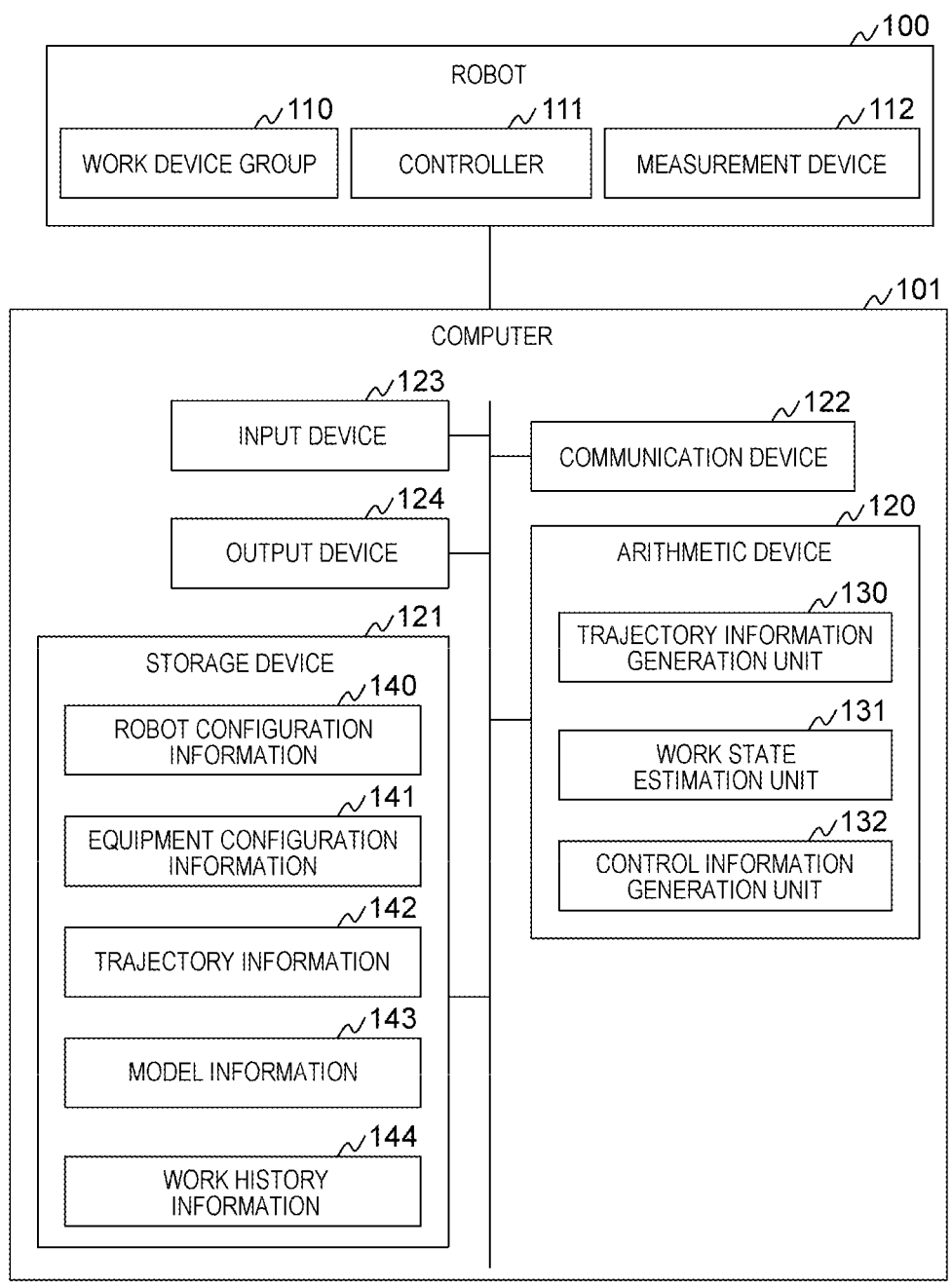
FIG. 1 is a diagram showing a configuration example of a system according to a first embodiment.

Hereinafter, embodiments of the invention will be described with reference to the drawings. However, the invention should not be construed as being limited to the description of the embodiments described below. Those skilled in the art will easily understand that a specific configuration of the invention can be changed without departing from the spirit and scope of the invention.

In the configuration of the invention described below, the same or similar configurations or functions are denoted by the same reference numerals, and redundant description will be omitted.

The notations such as "first", "second", and "third" in the present specification and the like are used to identify components, and do not necessarily limit the number or order.

Positions, sizes, shapes, ranges, and the like of the components shown in the drawings and the like may not represent actual positions, sizes, shapes, ranges, and the like in order to facilitate understanding of the invention. Therefore, the invention is not limited to the positions, sizes, shapes, ranges, and the like disclosed in the drawings and the like.

First Embodiment

FIG. 1 is a diagram showing a configuration example of a system according to a first embodiment.

The system includes a robot 100 and a computer 101. The robot 100 and the computer 101 are connected directly or via a network.

Based on control information output from the computer 101, the robot 100 grips an object (workpiece) and moves the object from a start point to an end point. The robot 100 includes a work device group 110, a controller 111, and a measurement device 112.

The work device group 110 is a group of devices that grip an object and move the object, and includes, for example, a hand, links, and a drive motor.

The controller 111 controls the work device group 110 based on the control information received from the computer 101. For example, the controller 111 moves the hand by driving the drive motor that functions as a joint and connects the links according to the control information. The controller 111 outputs, to the computer 101, operating state information including an angle, an angular velocity, and an angular acceleration of the joint, a torque and a current value of the drive motor, and the like.

The measurement device 112 measures a value for grasping a state of the object due to work of the robot 100. The value output from the measurement device 112 is also referred to as work state information. The measurement device 112 is, for example, an acceleration sensor, a force sensor, a camera, a contact sensor, or a current sensor. The robot 100 may include a plurality of measurement devices 112 of different types for measurement targets. The invention is not limited to installation positions and the number of the measurement devices 112.

The robot 100 may collectively transmit the operating state information and the work state information as one piece of information.

The computer 101 generates information on a trajectory that is a movement path of the robot 100 (trajectory information), and generates control information based on the trajectory information, the operating state information, and the work state information. The control information includes, for example, the following values.

(1) Next target angle, velocities, and angular acceleration of control axis
(2) Torque and drive current of drive motor
(3) Target coordinates, moving speed, and acceleration of object The computer 101 includes an arithmetic device 120, a storage device 121, a communication device 122, an input device 123, and an output device 124. The hardware elements are connected via an internal bus.

The storage device 121 is a device that stores a program to be executed by the arithmetic device 120 and information, and is, for example, a memory. The storage device 121 stores robot configuration information 140, equipment configuration information 141, trajectory information 142, model information 143, and work history information 144. The storage device 121 is also used as a work area.

The robot configuration information 140 is information on a configuration of the robot 100. A data structure of the robot configuration information 140 will be described with reference to FIG. 2.

The equipment configuration information 141 is information on equipment on which the robot 100 performs work. A data structure of the equipment configuration information 141 will be described with reference to FIG. 3.

The trajectory information 142 is information on the trajectory that is the movement path of the robot 100. A data structure of the trajectory information 142 will be described with reference to FIG. 4.

The model information 143 is information on a model (first model) for estimating an operating state and a model (second model) for generating the control information. The first model and the second model are functions, tables, neural networks, or the like. In the present embodiment, each model is a neural network. Each model is generated by machine learning using a simulator.

The work history information 144 is information for managing the operating state during the work and a history of a work state. Specifically, the operating state information and the work state information are accumulated in the work history information 144.

The arithmetic device 120 is a device that controls the entire computer 101, and is, for example, a processor. The arithmetic device 120 executes the program stored in the storage device 121. The arithmetic device 120 operates as a functional unit (module) that implements a specific function by executing processing according to the program. In the following description, when processing is described with a functional unit as a subject, it indicates that the arithmetic device 120 is executing a program that implements the functional unit. The arithmetic device 120 according to the present embodiment functions as a trajectory information generation unit 130, a work state estimation unit 131, and a control information generation unit 132.

The trajectory information generation unit 130 determines a trajectory of the hand based on input information such as a work content and a position of the object. The trajectory information generation unit 130 determines a trajectory of a tool based on the robot configuration information 140, the equipment configuration information 141, and the trajectory of the hand. The trajectory information generation unit 130 generates the trajectory information 142 indicating the determined trajectory. Since a method for determining the trajectory is a known technique, detailed description thereof will be omitted.

The work state estimation unit 131 estimates a future work state based on the trajectory information 142, the operating state information and the work state information accumulated in the work history information 144, and the first model.

The control information generation unit 132 generates the control information based on the trajectory information 142, the operating state information and the work state information accumulated in the work history information 144, an estimation result of the work state, and the second model.

For the functional units in the computer 101, a plurality of functional units may be integrated into one functional unit, or one functional unit may be divided into a plurality of functional units for each function.

The communication device 122 is a device for communicating with an external device, and is, for example, a network interface card (NIC).

The input device 123 is a device for inputting data, commands, and the like to the computer 101, and is, for example, a keyboard, a mouse, or a touch panel.

The output device 124 is a device for outputting a calculation result or the like of the computer 101, and is, for example, a display, a projector, or a printer.

FIG. 2 is a diagram showing an example of the data structure of the robot configuration information 140 according to the first embodiment.

The robot configuration information 140 stores entries including an ID 201, a classification 202, an item 203, and a content 204.

The ID 201 is a field for storing identification information of an entry. The classification 202 is a field for storing classification of elements constituting the robot 100. The item 203 is a field for storing a management item of each element. The content 204 is a field for storing a content of the management item. The content 204 stores a file, a numerical value, a character string, or the like.

For a link, a shape of the link is managed. For a joint connecting links, the links to be connected, a type of the joint, and a restriction on movement of the joint are managed. For the joint, an item to be managed as the restriction on the movement of the joint differs depending on the type of the joint.

FIG. 3 is a diagram showing an example of the data structure of the equipment configuration information 141 according to the first embodiment.

The equipment configuration information 141 stores entries including an ID 301, an equipment name 302, an attachment target 303, a relative position 304, and a relative posture 305.

The ID 301 is a field for storing identification information of an entry. The equipment name 302 is a field for storing a name of equipment. The attachment target 303 is a field for storing a name of a target to be attached to the equipment. The relative position 304 is a field for storing information (for example, coordinates) indicating a relative installation position of the attachment target with respect to the equipment. The relative posture 305 is a field for storing information (for example, coordinates) indicating a relative posture of the attachment target with respect to the equipment.

An entry with the ID 301 of "0" indicates that positions and postures of other pieces of equipment are determined with reference to an assembly cell A. An entry with the ID 301 of "1" stores a relative position and a relative posture of a Robo A installed to the assembly cell A.

Figure 4:
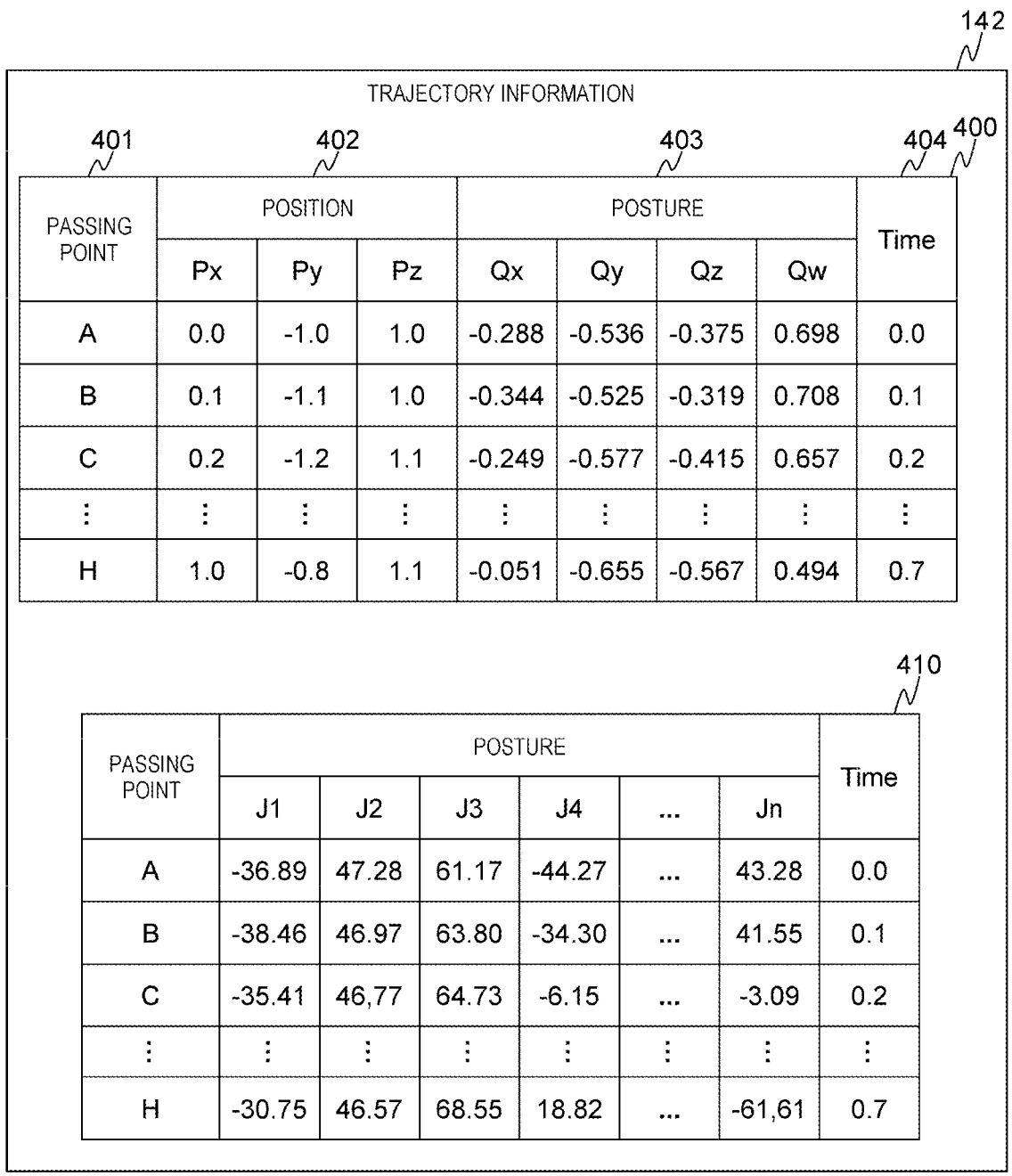
FIG. 4 is a diagram showing an example of a data structure of trajectory information according to the first embodiment.

FIG. 4 is a diagram showing an example of the data structure of the trajectory information 142 according to the first embodiment.

The trajectory information 142 stores a table 400 indicating a trajectory of the hand and a table 410 indicating a trajectory of the tool.

The table 400 stores entries including a passing point 401, a position 402, a posture 403, and a Time 404.

The passing point 401 is a field for storing identification information of a passing point on the trajectory. The position 402 is a group of fields for storing values indicating coordinates of the hand at the passing point. Each field of the position 402 stores a value in a Cartesian coordinate system. The posture 403 is a group of fields for storing values indicating a posture of the hand at the passing point. Each field of the posture 403 stores a value defined by a quaternion. The Time 404 is a field for storing a time at which the hand that started moving from a start point reaches the passing point.

The table 410 stores entries including a passing point 411, a posture 412, and a Time 413.

The passing point 411 is the same field as the passing point 401. The posture 412 is a group of fields for storing values indicating postures of joints at a passing point. Each field of the posture 412 stores an angle of the joint. The Time 413 is the same field as the Time 404.

The trajectory information 142 includes a set of the table 400 and the table 410 for each work content. When a main body of the robot 100 moves, the trajectory information 142 may include a table related to a trajectory of the main body of the robot 100.

Figure 7:
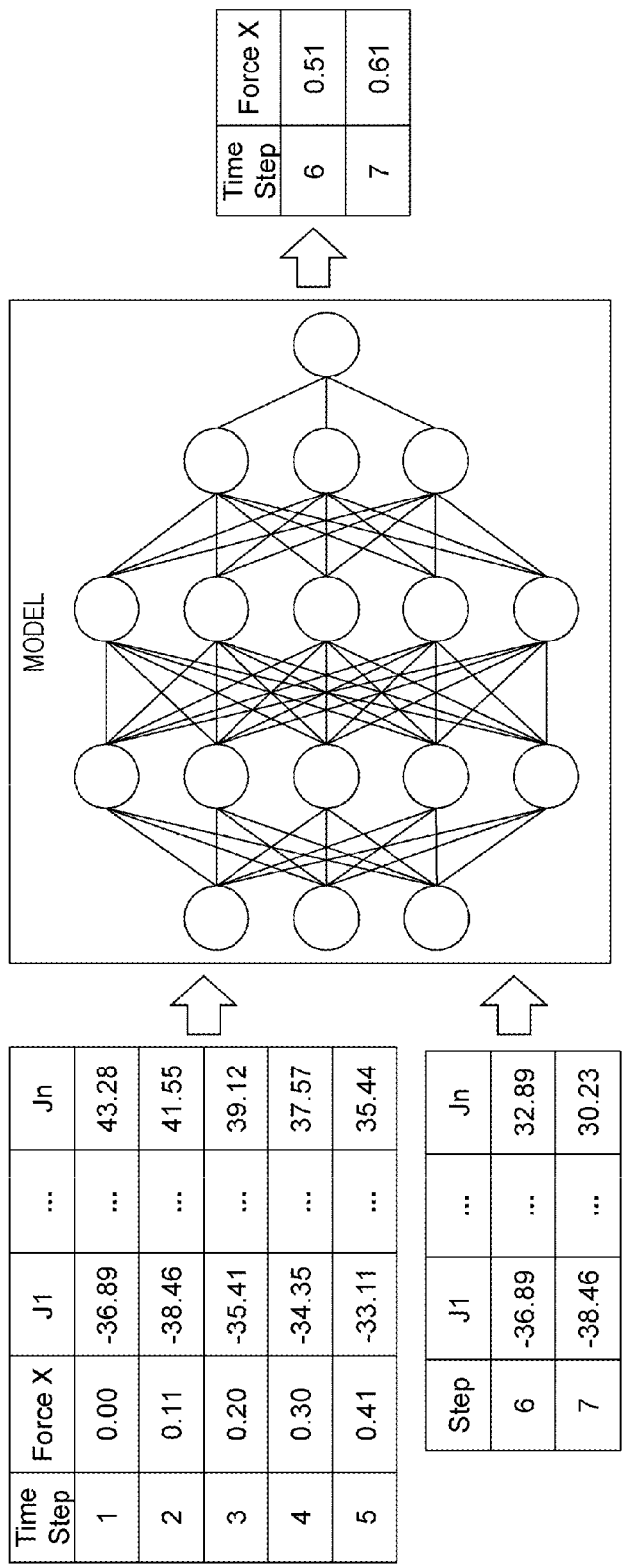
FIG. 7 is a diagram showing an example of a method for generating estimated work state information by the computer according to the first embodiment.

FIG. 5 is a flowchart showing an example of processing executed by the computer 101 according to the first embodiment. FIGS. 6A and 6B are diagrams showing examples of the operating state information and the work state information stored in the work history information 144 according to the first embodiment. FIG. 7 is a diagram showing an example of a method for generating estimated work state information by the computer 101 according to the first embodiment. In the following description, it is assumed that the trajectory information 142 is already generated.

The control information generation unit 132 starts loop processing of work (step S101). The loop processing of the work is repeatedly executed until a series of work such as gripping an object and moving the object along a trajectory path is completed.

The control information generation unit 132 acquires operating state information and work state information from the robot 100 (step S102), and stores the operating state information and the work state information in the work history information 144.

The operating state information is accumulated in the work history information 144 in a format as shown in FIG. 6A. One entry is the operating state information acquired for each time step that is a measurement cycle. The work state information is accumulated in the work history information 144 in a format as shown in FIG. 6B. One entry is the work state information acquired for each time step. Fx, Fy, Fz are force values in X-axis, Y-axis, and Z-axis directions, respectively. Tx, Ty, Tz are torque values in the X-axis, Y-axis, and Z-axis directions, respectively. Ax, Ay, Az are accelerations in the X-axis, Y-axis, and Z-axis directions, respectively. Vx, Vy, Vz are velocities in the X-axis, Y-axis, and Z-axis directions, respectively.

The control information generation unit 132 determines whether processing is possible (step S103). Specifically, the control information generation unit 132 determines whether the necessary number of pieces of operating state information and work state information for the processing are accumulated. In the present embodiment, it is determined whether the operating state information and the work state information for five steps are accumulated. The number of pieces of operating state information and work state information is, for example, a value obtained by dividing a measurement frequency of the measurement device 112 by an analysis frequency resolution.

When the processing is not possible, the control information generation unit 132 returns to step S102 and executes the same processing.

When the processing is possible, the control information generation unit 132 generates estimated work state information by instructing the work state estimation unit 131 to estimate a work state (step S104).

For example, as shown in FIG. 7, the work state estimation unit 131 inputs, to the neural network that is the first model, the operating state information and the work state information for five steps and the operating state information for two steps in the future generated from the trajectory information 142, and generates the estimated work state information for two steps in the future. Items to be input to the first model, the number of pieces of operating state information and work state information (a length in time series) to be input to the first model, and the number of pieces of estimated work state information to be generated can be set as desired. A structure of the neural network can be set as desired.

It is assumed that the restriction included in the robot configuration information 140 is taken into the first model according to the present embodiment.

The control information generation unit 132 generates control information by inputting, to the neural network that is the second model, the trajectory information 142, the operating state information and the work state information accumulated in the work history information 144, and the estimated work state information, and outputs the control information to the robot 100 (step S105).

When the work is not completed, the control information generation unit 132 returns to step S102 and executes the same processing. When the work is completed, the control information generation unit 132 ends the loop processing (step S106), and ends a series of processing.

At a start point of a trajectory, step S105 is executed without executing the processing of step S104. In this case, the control information generation unit 132 inputs, to the second model, for example, the trajectory information 142, and the operating state information and the work state information accumulated in the work history information 144, and generates the control information. The control information at the start point may be generated by another method.

According to the first embodiment, the computer 101 can generate the control information for implementing safe and reliable work by the robot by taking into consideration a current state of the object, a current state of the robot, and a future state of the object.

In the first embodiment, one computer 101 controls the robot 100, and a computer system including a plurality of computers 101 may perform the same control. In this case, functional units may be distributed and arranged in the plurality of computers 101.

Second Embodiment

In the related art, a measurement value measured by a sensor is used to grasp states of a robot and an object. Since the measurement value includes noise caused by an environment, the robot, or the object, it is necessary to remove the noise in order to accurately control the robot. In this regarding, a technique disclosed in JP-A-2019-942 (Patent Literature 2) is known.

In a method disclosed in Patent Literature 2, it is necessary to perform sampling by operating a robot in an unloaded state, which increases the number of steps before system operation. In Patent Literature 2, a value necessary for control is calculated by subtracting a value measured by a sensor in the unloaded state from a value measured by the sensor in a loaded state, but a motion component is removed together with noise according to this method.

In a second embodiment, a system will be described in which noise is removed from a measurement value and a robot is controlled using the measurement value without increasing the number of steps. Hereinafter, the second embodiment will be described focusing on differences from the first embodiment.

Figure 8:
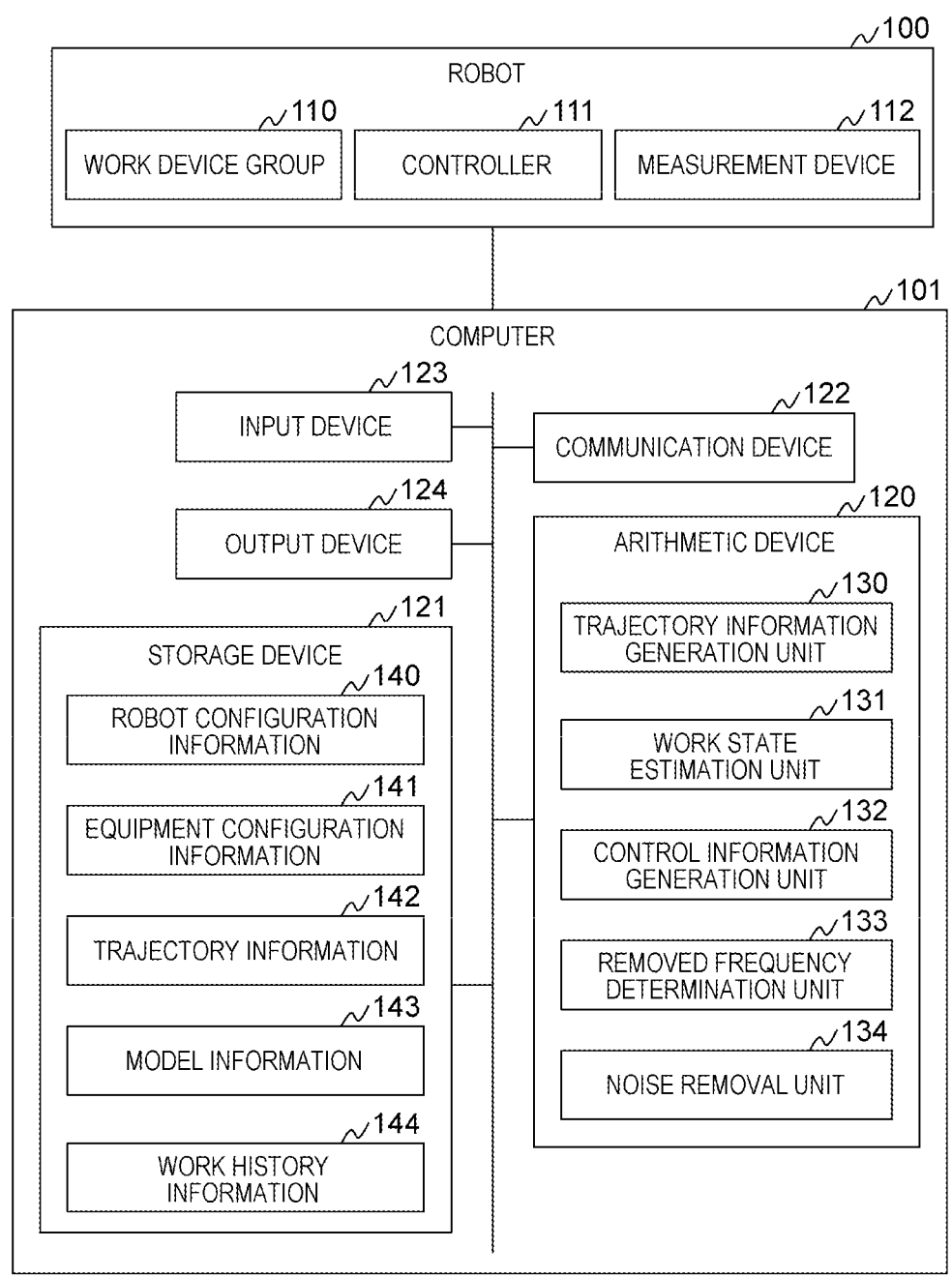
FIG. 8 is a diagram showing a configuration example of a system according to a second embodiment.

FIG. 8 is a diagram showing a configuration example of the system according to the second embodiment.

The configuration of the system according to the second embodiment is the same as that of the first embodiment. A configuration of the robot 100 according to the second embodiment is the same as that of the first embodiment. A hardware configuration of the computer 101 according to the second embodiment is the same as that of the first embodiment. Information stored in the computer 101 according to the second embodiment is the same as that of the first embodiment. In the second embodiment, a functional configuration of the computer 101 is partially different from that of the first embodiment. The arithmetic device 120 according to the second embodiment further functions as a removed frequency determination unit 133 and a noise removal unit 134.

The removed frequency determination unit 133 determines a frequency to be removed as noise based on a shape of a trajectory. The noise removal unit 134 removes noise from a measurement value included in work state information.

Figure 9:
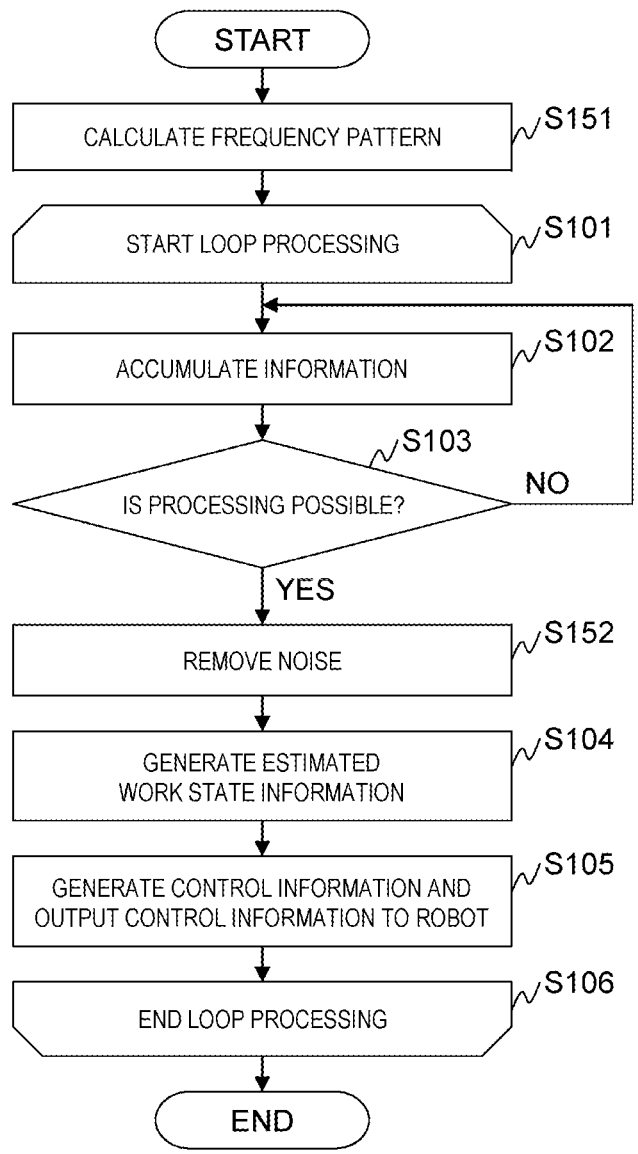
FIG. 9 is a flowchart showing an example of processing executed by a computer according to the second embodiment.
Figure 11B:
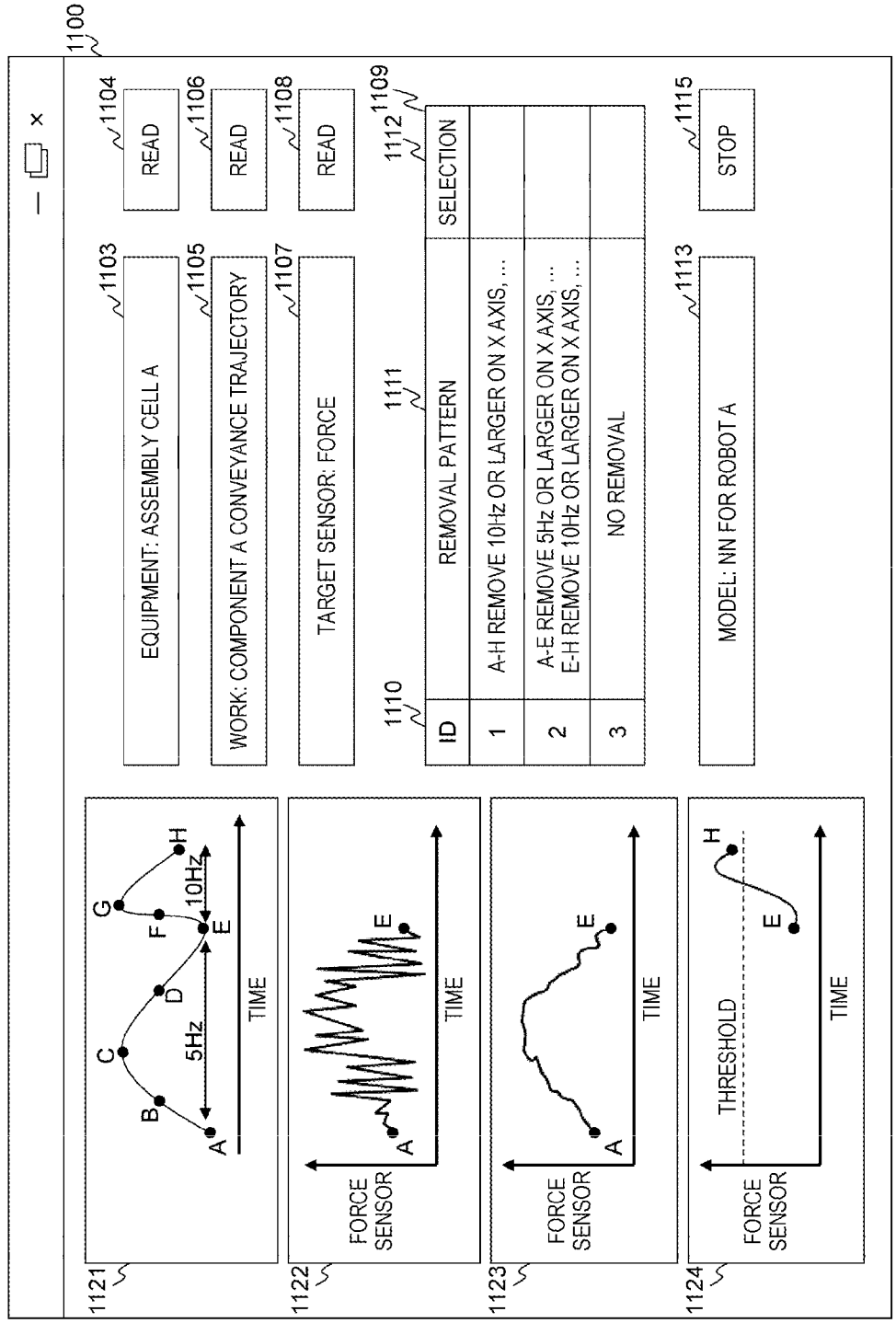
FIG. 11B is a diagram showing an example of the screen displayed by the computer according to the second embodiment.
Figure 12:
FIG. 12 is a diagram showing an example of noise removal by the computer according to the second embodiment.

FIG. 9 is a flowchart showing an example of processing executed by the computer 101 according to the second embodiment. FIG. 10 is a diagram showing an example of a data structure of noise analysis information generated by the computer 101 according to the second embodiment. FIGS. 11A and 11B are diagrams showing examples of a screen displayed by the computer 101 according to the second embodiment. FIG. 12 is a diagram showing an example of noise removal by the computer 101 according to the second embodiment.

Before starting the processing, the computer 101 displays a screen 1100 as shown in FIG. 11A via the output device 124. The screen 1100 includes display fields 1101, 1102, selection fields 1103, 1105, 1107, 1113, read buttons 1104, 1106, 1108, a removal pattern display field 1109, and an execute button 1114. At a start of the processing, the screen 1100 does not include the removal pattern display field 1109.

The selection field 1103 is a field for selecting equipment to be used for work. When the read button 1104 is operated, a value related to the equipment designated in the selection field 1103 is read from the equipment configuration information 141.

The selection field 1105 is a field for selecting work to be performed by the robot 100. When the read button 1106 is operated, the tables 400, 410 corresponding to the work are read, and a trajectory is displayed in the display field 1101.

The selection field 1107 is a field for selecting a type of a measurement value used to generate control information. When the read button 1108 is operated, a value related to a sensor that measures the measurement value is read from the equipment configuration information 141.

The selection field 1113 is a field for selecting a first model. The screen 1100 may include a field for selecting a second model.

When the execute button 1114 is operated, the computer 101 starts the processing described below.

The control information generation unit 132 generates a removed frequency pattern by instructing the removed frequency determination unit 133 to generate the removed frequency pattern (step S151). Specifically, the following processing is executed.

(S151-1) The removed frequency determination unit 133 acquires the trajectory information 142, divides the trajectory into partial trajectories, and generates a set having the divided partial trajectories as elements. The removed frequency determination unit 133 generates a plurality of sets by changing a division method. The trajectory itself is also generated as one set. Further, the removed frequency determination unit 133 generates a group having the sets as elements. The removed frequency determination unit 133 assigns an identification number as identification information of the group.

(S151-2) The removed frequency determination unit 133 selects one set from the group.

(S151-3) The removed frequency determination unit 133 selects a partial trajectory from the selected set.

(S151-4) The removed frequency determination unit 133 selects a coordinate axis to be analyzed. At this time, the removed frequency determination unit 133 adds an entry to noise analysis information 1000.

The noise analysis information 1000 stores entries including an ID 1001, a partial path ID 1002, a coordinate axis 1003, and a frequency 1004. The ID 1001 is a field for storing identification information of an entry (group). The partial path ID 1002 is a field for storing identification information of a partial path. The partial path ID 1002 stores a set of a passing point serving as a start point of the partial path and a passing point serving as an end point of the partial path. The coordinate axis 1003 is a field for storing a coordinate axis to be analyzed. The frequency 1004 is a group of fields for storing spectrum values of frequency components. The number of frequency components can be set as desired. A total value of the spectrum values of the respective frequency components is 1.

The removed frequency determination unit 133 sets identification information of a group in the ID 1001 of the added entry, sets identification information of a partial path in the partial path ID 1002, and sets a coordinate axis in the coordinate axis 1003.

(S151-5) The removed frequency determination unit 133 converts a shape of a partial trajectory on the selected coordinate axis into a frequency component using a known technique such as fast Fourier transformation (FFT). The removed frequency determination unit 133 sets a spectrum value of the frequency component in the frequency 1004 of the entry added to the noise analysis information 1000.

(S151-6) The removed frequency determination unit 133 determines whether the processing is completed for all the coordinate axes, namely an X axis, a Y axis, and a Z axis. When the processing is not completed for all the coordinate axes, namely the X axis, the Y axis, and the Z axis, the removed frequency determination unit 133 returns to S151-4 and executes the same processing.

(S151-7) When the processing is completed for all the coordinate axes, namely the X axis, the Y axis, and the Z axis, the removed frequency determination unit 133 determines whether the processing is completed for all the partial trajectories of the selected set. When the processing is not completed for all the partial trajectories of the selected set, the removed frequency determination unit 133 returns to S151-3 and executes the same processing.

(S151-8) When the processing is completed for all the partial trajectories of the selected set, the removed frequency determination unit 133 determines a frequency to be removed for each combination of a partial trajectory and a coordinate axis. In the present embodiment, a frequency corresponding to a spectrum value larger than a threshold is determined as the frequency to be removed. The removed frequency determination unit 133 stores information on the frequency to be removed for each combination of the partial trajectory and the coordinate axis in a work area as a removal pattern. The identification information of the group is assigned to the removal pattern.

(S151-9) The removed frequency determination unit 133 determines whether the processing is completed for all the sets. When the processing is not completed for all the sets, the removed frequency determination unit 133 returns to S151-2 and executes the same processing. When the processing is completed for all the sets, the removed frequency determination unit 133 displays removal pattern information in the removal pattern display field 1109. The removal pattern is displayed in the removal pattern display field 1109 in a table format. The table stores entries including an ID 1110, a removal pattern 1111, and a selection 1112. The ID 1110 is a field for displaying identification information of a removal pattern. The removal pattern 1111 is a field for displaying the removal pattern. The selection 1112 is a field for selecting the removal pattern. A user selects a removal pattern to be used by inputting a check in the selection 1112. The removed frequency determination unit 133 displays the removal pattern superimposed on a trajectory in the display field 1102.

When selection of the removal pattern is received from the user, the control information generation unit 132 ends the processing of step S151.

The processing from step S101 to step S103 is the same as that in the first embodiment. When it is determined in step S103 that the processing is possible, the control information generation unit 132 instructs the noise removal unit 134 to remove noise, thereby removing the noise from the work state information (step S152). Specifically, the following processing is executed.

(S152-1) The noise removal unit 134 reads the removal pattern selected by the user.

(S152-2) The noise removal unit 134 identifies a trajectory of each time step based on the trajectory information 142 and the operating state information, acquires a frequency corresponding to the identified trajectory from the removal pattern, and subtracts the frequency from the work state information. As a result, for example, noise removal as shown in FIG. 12 is performed.

The processing from step S104 to step S106 is the same as that in the first embodiment. The second embodiment is different from the first embodiment in that the work state information from which the noise is removed is used in steps S104 and S105.

During the work, the control information generation unit 132 may display display fields 1121, 1122, 1123, 1124 indicating a noise removal result and the estimated work state information on a left side of the screen 1100 as shown in FIG. 11B. The display field 1121 is the same as the display field 1102. The display field 1122 is a field for displaying a measurement value before noise is removed. The display field 1123 is a field for displaying the measurement value after the noise is removed. The display field 1124 is a field for displaying the estimated work state information. The second model outputs control information that does not exceed the threshold. In FIG. 11B, the execute button 1114 is replaced with a stop button 1115.

According to the second embodiment, the noise can be removed from the measurement value without increasing the number of steps and while remaining a motion component.

In the second embodiment, one computer 101 controls the robot 100, and a computer system including a plurality of computers 101 may perform the same control. In this case, functional units may be distributed and arranged in the plurality of computers 101.

The invention is not limited to the embodiments described above, and includes various modifications. For example, the embodiments described above have been described in detail for easy understanding of the invention, and the invention is not necessarily limited to those including all the configurations described above. A part of the configuration of each embodiment can be added to, deleted from, or replaced with another configuration.

In addition, a part or all of the above configurations, functions, processing units, processing methods, and the like may be implemented by hardware through, for example, design using an integrated circuit. Further, the invention can also be implemented by a program code of software that implements the functions of the embodiments. In this case, a storage medium recording the program code is provided on a computer, and a processor in the computer reads the program code stored in the storage medium. In this case, the program code itself read from the storage medium implements the functions of the above embodiments, and the program code itself and the storage medium storing the program code constitute the invention. Examples of the storage medium for supplying such a program code include a flexible disk, a CD-ROM, a DVD-ROM, a hard disk, a solid state drive (SSD), an optical disk, a magneto-optical disk, a CD-R, a magnetic tape, a nonvolatile memory card, and a ROM.

The program code that implements the functions described in the present embodiment can be implemented in a wide range of programs or script languages such as assembler, C/C++, perl, Shell, PHP, Python, and Java (registered trademark).

Further, the program code of the software that implements the functions of the embodiments may be distributed via a network to be stored in a storage unit such as a hard disk or a memory of a computer or a storage medium such as a CD-RW or a CD-R, and a processor in the computer may read and execute the program code stored in the storage unit or the storage medium.

In the embodiments described above, control lines and information lines that are considered to be necessary for description are shown, and not all control lines and information lines are necessarily shown on a product. All configurations may be interconnected.

What is claimed is:

1. A computer for controlling a robot that performs work including gripping an object and moving the object, the computer comprising:
    an arithmetic device;
    a storage device connected to the arithmetic device; and
    an interface connected to the arithmetic device, wherein
    the storage device stores trajectory information on a trajectory of the robot when the object is gripped and moved during the work of the robot, and
    the arithmetic device is configured to
        acquire operating state information including a value indicating an operating state of the robot during the work and work state information including a value for grasping a state of the object gripped by the robot,
        generate estimated work state information including a value for grasping a future state of the object gripped by the robot based on the trajectory information, the operating state information, and the work state information, and
        generate control information for controlling the robot based on the trajectory information, the operating state information, the work state information, and the estimated work state information,
    the work state information includes a measurement value acquired from a measurement device that is installed in the robot and measures a value for grasping the state of the object gripped by the robot, and
    the arithmetic device is configured to
        calculate a frequency to be removed corresponding to a shape of the trajectory based on the trajectory information, and
        remove noise from the measurement value included in the work state information based on the frequency to be removed.

2. The computer according to claim 1, wherein
    the storage device stores a first model that receives the trajectory information, the operating state information, and the work state information as inputs and outputs the estimated work state information, and a second model that receives the trajectory information, the operating state information, the work state information, and the estimated work state information as inputs and outputs the control information.

3. The computer according to claim 2, wherein
    the first model and the second model are neural networks generated by machine learning.

4. The computer according to claim 1, wherein
    the arithmetic device calculates the frequency to be removed according to the shape of the trajectory on each coordinate axis.

5. The computer according to claim 1, wherein
    the arithmetic device is configured to
        divide the trajectory into a plurality of partial paths, and
        calculate the frequency to be removed for each of the partial paths.

6. A method for controlling a robot that performs work including gripping an object and moving the object, the method being executed by a computer, wherein
    the computer includes an arithmetic device, a storage device connected to the arithmetic device, and an interface connected to the arithmetic device,
    the storage device stores trajectory information on a trajectory of the robot when the object is gripped and moved during the work of the robot, and
    the method for controlling the robot comprises:
    a first step of acquiring, by the arithmetic device, operating state information including a value indicating an operating state of the robot during the work and work state information including a value for grasping a state of the object gripped by the robot,
    a second step of generating, by the arithmetic device, estimated work state information including a value for grasping a future state of the object gripped by the robot based on the trajectory information, the operating state information, and the work state information, and
    a third step of generating, by the arithmetic device, control information for controlling the robot based on the trajectory information, the operating state information, the work state information, and the estimated work state information,
    the work state information includes a measurement value acquired from a measurement device that is installed in the robot and measures a value for grasping the state of the object, and
    the first step includes
        a fourth step of calculating, by the arithmetic device, a frequency to be removed corresponding to a shape of the trajectory based on the trajectory information, and
        a fifth step of removing, by the arithmetic device, noise from the measurement value included in the work state information based on the frequency to be removed.

7. The method for controlling the robot according to claim 6, wherein the storage device stores a first model that receives the trajectory information, the operating state information, and the work state information as inputs and outputs the estimated work state information, and a second model that receives the trajectory information, the operating state information, the work state information, and the estimated work state information as inputs and outputs the control information.

8. The method for controlling the robot according to claim 7, wherein
the first model and the second model are neural networks generated by machine learning.

9. The method for controlling the robot according to claim 6, wherein
the fourth step includes a step of calculating, by the arithmetic device, the frequency to be removed according to the shape of the trajectory on each coordinate axis.

10. The method for controlling the robot according to claim 6, wherein
the fourth step includes
a step of dividing, by the arithmetic device, the trajectory into a plurality of partial paths, and
a step of calculating, by the arithmetic device, the frequency to be removed for each of the partial paths.

11. A computer system for controlling a robot that performs work including gripping an object and moving the object, the computer system comprising:
a plurality of computers each including an arithmetic device, a storage device connected to the arithmetic device, and an interface connected to the arithmetic device, wherein
the computer system manages trajectory information on a trajectory of the robot when the object is gripped and moved during the work of the robot,
each of the plurality of computers is configured to
acquire operating state information including a value indicating an operating state of the robot during the work and work state information including a value for grasping a state of the object gripped by the robot,
generate estimated work state information including a value for grasping a future state of the object gripped by the robot based on the trajectory information, the operating state information, and the work state information, and
generate control information for controlling the robot based on the trajectory information, the operating state information, the work state information, and the estimated work state information,
the work state information includes a measurement value acquired from a measurement device that is installed in the robot and measures a value for grasping the state of the object gripped by the robot, and
each of the plurality of computers is configured to
calculate a frequency to be removed corresponding to a shape of the trajectory based on the trajectory information, and
remove noise from the measurement value included in the work state information based on the frequency to be removed.

12. The computer system according to claim 11, further comprising:
a first model that receives the trajectory information, the operating state information, and the work state information as inputs and outputs the estimated work state information; and
a second model that receives the trajectory information, the operating state information, the work state information, and the estimated work state information as inputs and outputs the control information.

* * * * *